Sept. 29, 1964 D. C. KRAHE 3,150,836
APPARATUS FOR MIXING AND MILLING VISCOUS MATERIALS
Filed Jan. 27, 1961 3 Sheets-Sheet 1
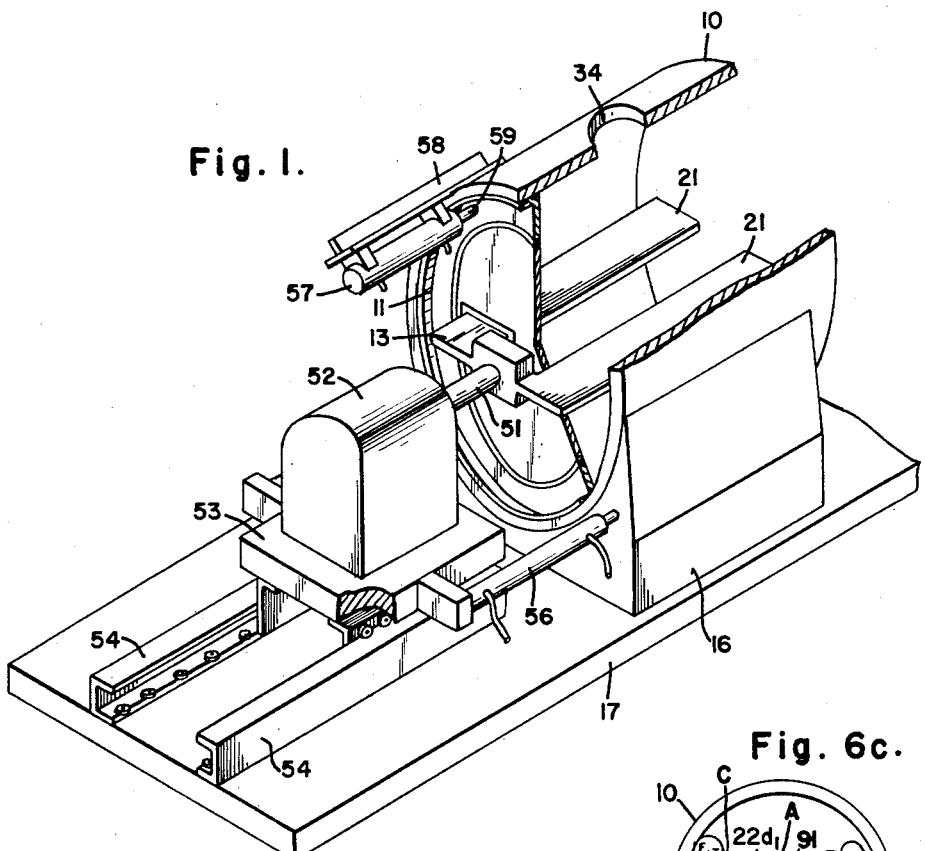
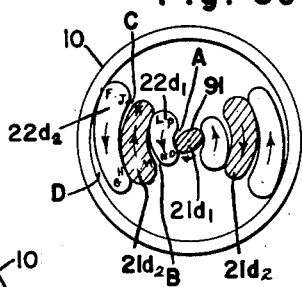
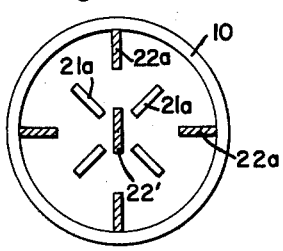
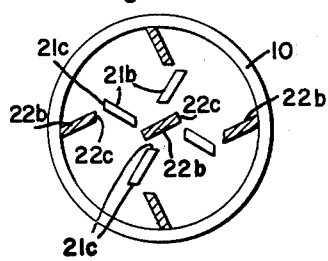
INVENTOR.
Donald C. Krahe
BY
Townsend and Townsend

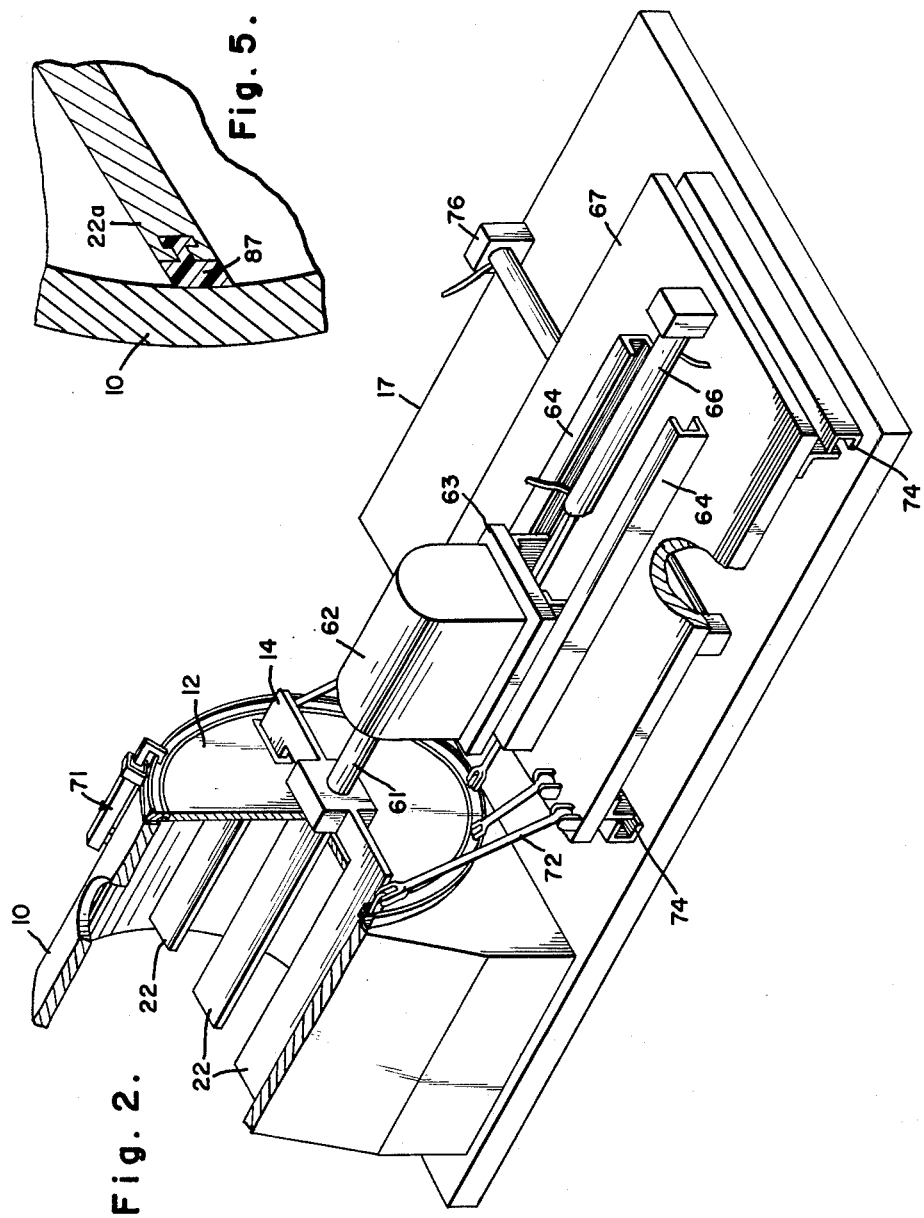

Sept. 29, 1964　　　　D. C. KRAHE　　　　3,150,836
APPARATUS FOR MIXING AND MILLING VISCOUS MATERIALS
Filed Jan. 27, 1961　　　　　　　　　　　　　　　3 Sheets-Sheet 3

INVENTOR.
Donald C. Krahe
BY

United States Patent Office 3,150,836
Patented Sept. 29, 1964

3,150,836
APPARATUS FOR MIXING AND MILLING
VISCOUS MATERIALS
Donald C. Krahe, San Mateo, Calif.
(3614 Hillcrest Drive, Belmont, Calif.)
Filed Jan. 27, 1961, Ser. No. 85,235
12 Claims. (Cl. 241—117)

This invention relates to a process for mixing highly viscous materials and apparatus for practicing the process.

The prior art profusely discloses apparatus for mixing highly viscous fluids and materials, many of which more or less adequately perform their job-lot functions. However, the advent of the technical revolution in the chemical and related fields has increasingly focused attention on deficiencies of apparatus of the prior art for mixing highly viscous materials. When the quantity of materials to be mixed is small, as is the case with a druggist's prescription or the requirements of many research and development laboratories, manually operated open mills or Banbury mixers can be used. But when it comes to mixing vast quantities of granular materials and/or highly viscous fluids, the job-lot type of operation is technically objectionable and economically indefensible.

One striking example of the problem is delineated by the increasing attention given to the use of solid propellants for rockets, which propellants comprise intimately mixed fuels and oxidants. To mix such highly viscous materials, it is necessary to provide heavy duty apparatus. In the past, sigma blade mixers have often been employed and, while they are sufficient to mix most materials, they do not avoid build up along the sides of the containers nor can they be easily emptied of their contents. In fact, combining propellant components in these mixers ordinarily requires a worker to scrape the blades and the interior of the container between batches. Not only is such an activity highly costly, it materially reduces capabilities of the processing line.

The present invention is designed to overcome many of the shortcomings of prior art high shear mixers. The present apparatus utilizes multi-blade assemblies supported for rotation in opposite directions or at least at differential speeds with the blades interleaved. Not only do the fork type blade assemblies exemplarily rotate in opposite directions to assist in blending the materials but the blade assemblies, container and end plates supporting the blade assemblies are designed to cooperate to assure continuous scraping of the interior surfaces of the mixer and blades. The result is high shear mixing apparatus which effectively and intimately mixes two or more viscous materials without lumping the materials in dead spaces along the inside surface of the container whereby the end product is not thoroughly mixed.

Another feature of the present invention pertains to means for scraping the interior surfaces thoroughly during the course of discharging the mixed materials from the apparatus. This can best be appreciated by considering the steps which are carried out after the materials are thoroughly mixed. Specifically, after the material has been mixed, one of the blade assemblies is moved away from the end plate to a point where the blades' bitter ends are flush with the interior surface of the end plate. During this movement the blades are scraped against the surfaces defining the blade apertures in the end plate. After the blades are scraped clean of mixed materials, the end plate is moved transversely to the mixing cylinder to scrape the inside surface of the end plate against the edge of the cylinder. Next, the opposite end plate is caused to move through the cylindrical body which scrapes the blades of its cooperating translationally fixed blade assembly as well as the interior surfaces of the cylinder. After the longitudinally movable end plate has fully discharged the material from the cylinder, the transversely movable end plate is repositioned and, as it is repositioned, scrapes clean the inner surface of the longitudinally movable end plate. At this point all surfaces have been cleared of the mixed material and the end plates and blade assemblies are returned to their initial positions for the cycle to repeat.

In a second illustrative embodiment of the apparatus, instead of removing one end plate preparatory to discharging the mixed materials outwardly therethrough, a discharge port is provided. When opened, it discharges the materials as the longitudinally movable end plate moves through the cylinder to force the mixed materials out through the port. This variation does not permit all surfaces to be scraped, but if a relatively continuous operation is the modus operandi, the small amount of mixed material remaining will be blended with the next charge of mixed materials and discharged in part at least.

Yet another feature of the invention pertains to means for venting the interior of the mixer to the atmosphere at selected intervals to permit the expandable gases formed when certain types of materials are mixed under high temperature conditions to escape. A passageway through the shell of the mixer is momentarily opened just after a blade scrapes clean a preselected part on the cylinder wall in order to release these gases and yet not permit the materials to be forced out of the vent by the mixing operation.

Another feature of the invention pertains to the loading port and closure plug therefor formed in one side of the mixing cylinder to permit the apparatus to be charged with unmixed materials from time to time.

The exemplary embodiments of the present invention employ rectangularly shaped blades but, as will be pointed out in more detail below, a variety of blade configurations may be envisioned that cooperate to thoroughly mix viscous materials and scrape all inner surfaces periodically. One further salient modification of the blade assemblies is the fashioning of kidney-shaped tines or blades that cooperate to form a plurality of milling pockets so that the high shear apparatus may be used for milling and mixing viscous materials. In accordance with this latter arrangement, a feature of the invention pertains to the apparatus for mixing and milling granular materials that has tines that overlap in interleaved relation to form milling pockets between the adjacent tines that entrap granules of the material so the cooperating surfaces of the tines may pulverize them as the tines are counter- or differentially rotated past each other. The pockets are constructed by forming the cooperating surfaces on adjacent tines respectively as the arc of a circle and the arc of a convolute having a common termination point. The surfaces are rotated to pass in close proximity to each other at one end to provide a roughly triangular shaped pocket.

These and other features of the present invention will be more fully understood when the following detailed description is read with reference to the drawings, in which:

FIG. 1 is a perspective viewed from the left side of the mixing apparatus with certain parts partially cut away to more clearly illustrate the cooperation of the left blade assembly and end plate;

FIG. 2 is a perspective taken from the right side of the mixing apparatus with certain parts partially cut away to more clearly illustrate the cooperation of the right blade assembly and end plate;

FIG. 5 is a partial end cross section view illustrating the cooperative relationship between the side of the cylinder container and a mixing blade employing an insert;

Figure 7A:
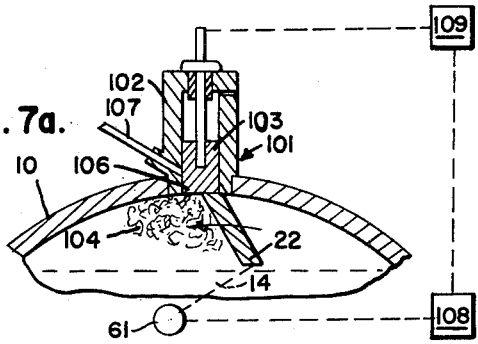
Figure 7B:
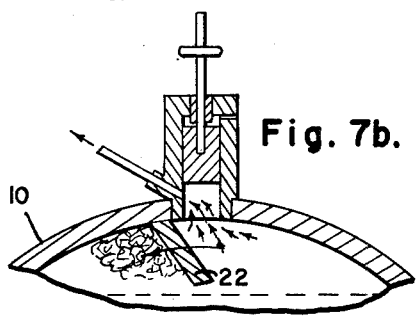

FIGS. 6 are end section schematics illustrating different blade configurations that may be employed in the present apparatus, more particularly, FIG. 6a is an end section of the type of blade assemblies illustrated in the exemplary embodiment of FIGS. 1–3, FIG. 6b is an end section view of the blade assemblies wherein the cross section of the blades are formed in the shape of parallelograms, and FIG. 6c is an end section view of blade assemblies formed of closed curvilinear surfaces and designed for a combination milling and mixing device; and FIG. 7 is a partial end view of a gas relief valve that permits the egress of gas from the interior of the mixing apparatus, more particularly, FIG. 7a illustrates the gas relief valve in its closed position preceding the movement of a blade past the valve aperture, and FIG. 7b illustrates the gas relief valve in its open position just after a blade has moved past the valve aperture.

Figure 3:
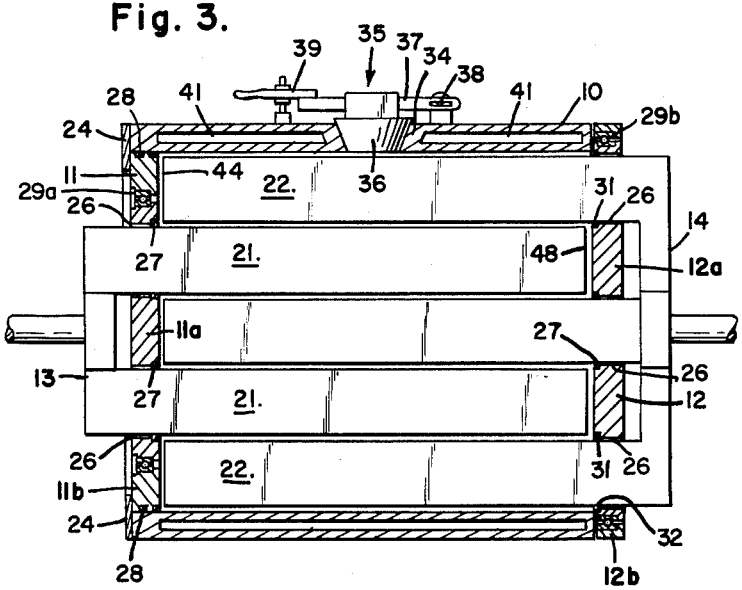
FIG. 3 is a cross section view of the mixing apparatus with the left and right blade assemblies depicted in full to illustrate the cooperative arrangement between the end plates, blade assemblies and cylindrical container.

The particular arrangement of the interleaved blades may be seen most clearly in FIG. 3 which is a side section taken approximately through the middle of the cylinder 10. As can also be seen in this figure, the left end plate 11 is slideably supported at the left side of cylinder 10 and prevented from moving outwardly (towards the left side of the FIG. 3 drawing) by a circular shoulder or retaining member 24 affixed to the end of a cylinder 10 and extending radially interior of the diameter of the end plate 11 to bear against outer part 11b.

End plate 11 has a pair of rectangular shaped apertures 26 formed therethrough which act to receive the rectangular blades 21 of the left blade assembly 13. Materials interior of the cylinder 10 are prevented from moving out between the end plate 11 and the blades 21 by rectangular seals 27 associated with the end plate 11. These seals also act as scraping surfaces as the blade assembly 13 is withdrawn from the end plate 11 for cleaning purposes. In a similar manner, annular seal 28 cooperates with the end plate 11 and the interior wall of cylinder 10 to prevent leakage. The right blade assembly 14 cooperates with rectangular apertures 26 formed in the right end plate 12, the latter supporting the rectangular blades 22 interior of cylinder 10. Again, a rectangular seal 27 is provided for the center tine although the two outer tines utilize U-shaped seals 31 which, in conjunction with circular seal 32, prevent materials from being forced out of the cylinder between the end plate 12 and the cylinder 10 and/or the outer tines. These seals also act to scrape materials off of the tines of assembly 14 as it moves translationally along the axis of cylinder 10 during an operating cycle.

Also provided are loading port 34 and closure means 35 therefor. The closure means 35 includes a plug 36 supported by an actuating bar 37 which is pivotally supported at one end 38 for rotation between open and closed positions. When the plug 36 is in its closed position, a dog 39 maintains it there until such time as the dog 39 is rotated out of the way and the plug 36 and locking bar 37 pivoted upward.

The cylinder 10 is also circumferentially apertured as illustrated at 41 in order to permit water or other temperature regulated fluids to be circulated in the cylinder during operation. When highly viscous materials are being mixed, an elevated ambient temperature is preferable and the fluid jacket permits control. Provision for temperature control is not necessary in all cases but where necessary the jacket provides temperature control in a straightforward manner.

Before considering the structural apparatus illustrated in FIGS. 1 and 2 for controlling the cycle of operation of the present mixing apparatus, it is well to consider the steps in the process with respect to FIG. 3. Once the sequence of steps is understood, it will be easier to relate the apparatus to the functions required. In the initial situation with the cylinder 10 empty, closure means 35 are opened and a charge of the highly viscous materials to be mixed are placed interior of the cylinder 10. With the closure means 35 blocking the port 34, the left and right blade assemblies 13 and 14 are rotated in opposite directions to obtain a thorough mixing of the materials. Due to the configuration of end plates 11 and 12, both of which comprise inner rotating parts 11a and 12a and rotatively stationary links 11b and 12b, the disks 11a and 12a rotate with their respective blade assemblies 13 and 14. This is possible because ball bearing races 29a and 29b support the disks 11a and 12a for rotational movement within their concentric links 11b and 12b, respectively.

As mentioned earlier, inasmuch as the clearances between adjacent blades 21 and 22 are quite small, the materials are thoroughly mixed and to some extent pulverized. Also, as the right blade assembly 14 rotates due to the close proximity of the outer edges of the outer tines to the interior wall of cylinder 10, the cylinder walls are continuously scraped. This prevents buildup of unmixed materials thereon. During operation, the blade assemblies are also slowly moved in translation as they counterrotate thereby assuring repetitive scraping of the tines as well as the container walls. With this arrangement, the end result is a thoroughly mixed product. These is virtually no possibility that lumps of one of the ingredients will be distributed throughout the mix.

After the materials have been thoroughly mixed, the right blade assembly 14 moves outwardly from the cylinder 10 beyond the right end as the blades are scraped due to the close fit between seals 27, 31 and 32. After the bitter ends 44 of tines 22 are flush with the inner surface of the plate 12, both the rotating part 12a of the end plate 12 along with the rotatively stationary ring 12b are caused to move transversely to the longitudinal axis of cylinder 10 which opens up the right side of the apparatus. In doing so, the end of cylinder 10 scrapes the material from the inner side of plate 12 and the bitter ends 44 of the blades 22. As the right end plate 14 is removed, means (not shown) must be provided to collect the mixed material as it flows out or is subsequently forced out of the cylinder 10.

Once the right end of the cylinder 10 is opened, means are provided to move the left end plate, including rotative part 11a and the rotatively stationary ring 11b, longitudinally along the inner surface of the cylinder 10 while blade assembly 13 is held against longitudinal movement. This has the dual function of scraping the materials off of blades 21 (due to seals 27) as well as scraping excess materials off the interior surface of cylinder 10 by virtue of seal 28 which cooperates with end plate 11 and cylinder 10. When the left end plate 11 has moved fully through the cylinder 10 to a position flush with the right edge of cylinder 10, the ends 48 of tines 21 are also flush with the inner surface of plate 11 and the material is discharged from the apparatus. At this point, right end plate 12 along with blade assembly 14 returns to its operative position enclosing the right end of cylinder 10. Its leading edge scrapes any remaining material off of the interior surface of plate 11 and the ends 48 of tines 21.

With the right end plate 12 repositioned and locked in place, the left end plate 11 is withdrawn to its normal position at the left side of the cylinder 10 and blade assembly 14 is moved into overlapping relationship to blade assembly 13. The port 34 is then opened and another charge of materials placed in the container by positive loading or through a suction fill.

FIGS. 1 and 2 disclose the means for effecting this sequence of operations. The left blade assembly 13 is mounted on a shaft 51 which is rotated by a gear motor 52, the latter in turn supported on a horizontal platform 53 for longitudinal movement (with respect to base plate 17) along a pair of guide rails 54. The gear motor 52 and platform 53 can be moved longitudinally along guide rails 54 by hydraulic cylinders 56 which connect each side of platform 53 to the cylinder support 16. During normal operation, the gear motor 52 is slowly oscillated between its forward position (as illustrated in FIG. 1) and outward position by alternate actuation of hydraulic cylinder 56. Similarly, as the blade assemblies counter-rotate, assembly 14 and gear motor 62 are oscillated slowly along track 64 between their forward positions (illustrated in FIG. 2) and their outward position (tines 22 withdrawn from cylinder 10) by alternate operation of hydraulic cylinder 66. The operation of gear motor 62, etc., is more fully explained below.

A plurality of hydraulic cylinders 57 are provided about the periphery of cylinder 10 to move the left end plate 11 along the interior of cylinder 10 during the discharge operation. These hydraulic cylinders 57 are supported on extending base plates 58 which are affixed to the outside of cylinder 10 at three or more spaced apart points around the periphery thereof. The hydraulic cylinders 57 are affixed to extension plates 58 and the piston 59 is attached to the outside of end plate 11. Upon actuation of cylinders 57 the end plate 11 is caused to move longitudinally through cylinder 10 as previously explained.

Turning to the apparatus for manipulating the right end plate 12 and right blade assembly 14, the blade assembly 14 is affixed to a shaft 61 which is driven by a gear motor 62 supported on a first or gear motor platform 63. The latter is longitudinally slideable along a pair of guide rails 64 attached to a second platform 67 under the control of a hydraulic cylinder 66. Cylinder 66 is connected between the second platform 67 and the gear motor platform 63. Actuation of cylinder 66 causes gear motor 62 and platform 63 to move away from the right end of cylinder 10 thereby withdrawing blade assembly 14 from the right end plate 12. During this operation and others involving the mixing process, a plurality of dogs 71 affixed to the periphery of cylinder 10 engage the outer lip of end plate 12 to hold it firmly in situ.

After the blade assembly 14 has been withdrawn from the cylinder, dogs 71 are released automatically or manually so that the end plate 12 can be moved transversely. End plate 12 is supported on the second platform 67 by a plurality of pivoted linkages 72 and, inasmuch as platform 67 is supported on base 17 for transverse movement along a second pair of guide rails 74, the end plate 12 may be moved transversely to the longitudinal axis of the cylinder 10 to completely open the right end. Movement of the second platform 67 in a transverse direction is effected by a hydraulic cylinder 76 which is affixed between platform 67 and the frame 17. Upon actuation of cylinder 76, the entire blade assembly 14, plate 12 and platforms 63 and 67 are moved away from the end of cylinder 10. At this point end plate 12 remains until end plate 11 is moved through cylinder 10 to a position adjacent the right end of the cylinder 10. End plate 12 is thereafter returned to its position overlying the end of the cylinder 10. In so moving, plate 12 scrapes the inner surface of plate 11 to complete the task of emptying cylinder 10. Once in place, dogs 71 can re-engage end plate 12 to hold it firmly against cylinder 10 and cylinder 66 is operated to return the E-shaped blade assembly 14 to its operating position interior of cylinder 10.

Figure 4:
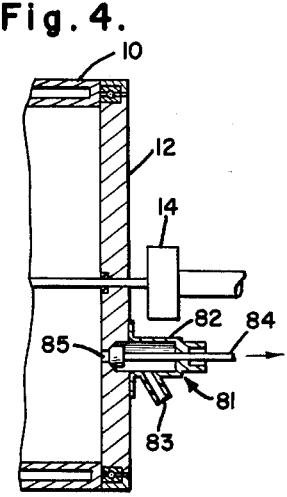
FIG. 4 is a partial cross section of the right end of the mixing apparatus illustrating an alternative means for discharging the fully mixed material from the apparatus.

A somewhat simpler though not as complete method of discharging materials from the right side of the mixing apparatus is feasible if the exemplary embodiment is modified as illustrated in FIG. 4. In this instance, the right end plate 12 is held fixed against the end of cylinder 10 although the blade assembly 14 will still be withdrawn to scrape the blades against the gaskets 27, 31 and 32 defining the apertures through plate 12. A discharge assembly 81 is provided which includes a closed cylinder 82, a discharge port 83 and a longitudinally movable piston 84. The piston 84 may be spring biased or otherwise held firmly against the port 85 in the end plate 12 until time to empty materials from cylinder 10. The material is forced out through ports 85 and 83 into a container or conveyor system for further processing. The use of a discharge port naturally simplifies the control apparatus needed for the right end plate 12 and blade assembly 14 but has the disadvantage of not permitting complete scraping of all interior surfaces between mixing operations.

It can be desirable under certain circumstances to provide resilient inserts of one sort or another for the outer tines of the blade assemblies 13 and 14 in order to assure adequate and careful scraping of the interior wall of cylinder 10. An exemplary insert is illustrated in FIG. 5. The insert 87 made of Teflon, nylon or some other plastic having desirable properties is fitted into the end of an exemplary tine 22a and so proportioned to bear against the inner surface of cylinder 10 as its blade assembly rotates. Teflon, for example, provides a low resistance drag and also avoids binding or gouging of the interior wall.

While the principal exemplary embodiments have been described in connection with blade assemblies utilizing rectangular blade configurations which lie in single common planes, a variety of other blade configurations can be employed within the scope of the invention. FIG. 6a, for example, illustrates cooperating blade assemblies, the tines of which are rectangular in cross section but wherein each assembly employs a number of tines staggered at 90° angles around the periphery of the assembly. For example, blades 21a are staggered about their axis of rotation by 90° increments while the outermost tines 22a of the cooperating blade assembly are staggered 90° and cooperate with a single central tine 22' in one common plane of two oppositely disposed tines 22a. A somewhat different configuration is illustrated in FIG. 6b wherein the plurality of tines 21b assocaited with one blade assembly, though they are staggered by approximately 90°, have parallelogram cross sections. Cooperating tines 22b of the other blade assembly are also shaped as parallelograms and peripherally staggered. The cooperating surfaces 21c, 22c of the tines are chords that assure an extended area of contact between the blades.

A third and somewhat more radical departure from the principal blade configurations is illustrated in FIG. 6c. This particular blade configuration is designed to advantageously incorporate features of a milling device into the mixing apparatus, whereas the previous blade arrangements are more particularly designed to vary the mixing operations per se. The blades of one blade assembly are labelled 22d and those of the other oppositely rotating one 21d. Only one-half of the blade assemblies illustrated in FIG. 6c is considered herein though its symmetrical counterpart is illustrated (to the right of the axis of rotation 91). Tines $21d_1$ and $21d_2$ (two staggered 180°) form one blade assembly and $22d_1$–$22d_2$ (two of each staggered 180°) the other blade assembly.

Tine $21d_1$ is oval shaped and its major diameter substantially coincides with the diameter of the generated surface OP of blade $22d_1$. The interaction of these tines forms a kneading pocket A for trapping material for milling. The outer surface of blade $22d_1$ (denominated LN) spirals slowly towards the axis of rotation 91 while the surface LM on cooperating blade $21d_2$ constitutes an arc of a circle having its center coinciding with axis 91. This arrangement, it will be noted, permits blades $22d_1$ and $21d_2$ to come in closest juxtaposition at point L with a second kneading pocket B defined by the tine surfaces trapping material to be milled. In a similar fashion, the outer surface HK of blade $21d_2$ spirals towards the center of rotation (axis 91) while the surface HJ on blade $22d_2$ cooperating therewith is an arc of a circle the center of which coincides with axis 91. These tine surfaces define another kneading pocket C as the tines are rotated past one another. Finally, the outermost surface FG of blade $22d_2$ spirals slowly towards the center of rotation axis 91 and is most closely juxtaposed to the interior surface of cylinder 10 adjacent point F. This provides yet another kneading pocket D between the wall of cylinder 10 and the surface FG of tine $22d_2$.

The arrangement illustrated provides a minimum separation between the cylinder wall 10 and blade $22d_2$ at F, blades $22d_2$ and $21d_2$ at H, blades $21d_2$ and $22d_1$ at L and blades $22d_1$ and $21d_1$ at O. It can be seen that a plurality of pockets A, B, C and D are formed between cooperating surfaces of the tines which grind or mill the material into a fine granular powder. This in addition to mixing the materials intermediate the interleaving positions of the rotating blades. It should be noted that the apertures in the end plate through which the tines of the blade assembly project and the seals cooperating therewith must be complementary to the shapes of the individual tines. This assures that the blades are scraped clean as the blade assemblies are moved outward from their respective end plates. The proposed configuration retains the advantages basic to the instant high shear mixing apparatus and, at the same time, provides a milling action that has heretofore required a separate operation.

Some uses of the present apparatus will require the maintenance of high ambient temperatures during the mixing process. In many such situations, various gases are liberated during the course of mixing which must be vented periodically to avoid dangerous and/or unwanted results. It is necessary to judicially remove the gases at the proper point in the operating cycle to avoid clogging the venting means with the highly viscous material being mixed. Exemplary means for satisfying these requirements is illustrated in FIG. 7. The means provided are one or more relief valve assemblies 101, each of which includes a body member or cylinder 102 attached at angularly displaced locations on cylinder 10 and piston members 103 supported interior of the cylinders for radial movement. The top of the piston 103 is normally maintained flush with the inner surface of cylinder 10 (illustrated in FIG. 7a). This situation obtains as an outermost blade, 22 for example, scrapes the wall of the container 10 in moving a quantity of material 104 past the port opening 106 that connects the interior of the mixing apparatus with the cylinder 102. Immediately after blade 22 passes beyond port or aperture 106, there is no danger of a blade forcing materials into the relief valve 101 and clogging it. Therefore, the piston 103 is moved radially outward momentarily to permit gases to flow through port 106 and discharge port 107. The operational steps of this gas relief valve assembly 101 are illustrated in FIG. 7a (normal closed position) and FIG. 7b (open position). The operation of the gas relief valve may be coordinated with the angular position of the blade assembly having the outermost tines by any number of expedient techniques whereby the piston momentarily opens passageways 106 and 107 following the passage of a blade past the port opening 106. For example, and as illustrated schematically in FIG. 7a, shaft 61 (which moves right blade assembly 14 including blade 22) is linked to synchronization means 108. Synchronization means 108 is linked to valve operating means 109 which causes valve 101 to alternately open and close. In operation, rotation of shaft 61 actuates synchronization means 108 which in turn actuates valve operating means 109 so as to cause valve 101 to open or close as illustrated in FIGURES 7a and 7b depending upon the rotated position of shaft 61. More specifically, synchronization of the opening and closing of valve 101 with blade rotation may be accomplished as follows through the use of two microswitches, a solenoid, and appropriate circuitry (not shown). The microswitches may be rigidly mounted outside of the mixing chamber in such a position so as to be successively tripped by either the exterior portions of each of the mixing blades as the blades rotate or, as indicated schematically in the drawing, by the rotation of shaft 61 by means of switch tripping abutments suitably fixed on the exterior circumference of shaft 61. As a mixing blade approaches the area of the valve 101 as shown in FIG. 7a, the exterior portion of the blade 22 or an abutment on shaft 61 momentarily trips a normally open microswitch. This action energizes the coil of a relay having a holding circuit. The relay energizes a solenoid connected to the valve stem of valve 101. This closes the valve. Motion of the solenoid armature and valve stem is opposed by, but not overcome by, a compression coil spring. Since the relay has a holding circuit, the solenoid remains energized and the valve stays closed while the mixing blade passes the valve area.

When the blade 22 reaches the position shown in FIG. 7b the exterior portion of the blade (or suitably positioned abutment on shaft 61) momentarily trips a second microswitch which is a normally closed switch. This opens the coil circuit of the relay which causes the solenoid to be de-energized. The valve stem and solenoid armature are then moved to their former position by the spring and the valve is opened as shown in FIG. 7b. This completes the cycle and the valve remains open until the next mixing blade approaches valve 101.

It should be apparent that in cases where mixing is performed under vacuum conditions, it may be necessary to actually draw the gases out of the container. While no pump is disclosed, it should be apparent that it could be connected to passageway 107.

No detailed circuit is specifically disclosed for sequencing the operational steps of the present high shear mixing apparatus, however, it should be appreciated that an understanding of the particular functions performed and their order of performance permits any number of control systems to be designed for the task. Thus, an automatic system using conventional components including timers can assure performance of all operations from loading through material discharging to reloading.

Although the present invention has been described with respect to certain exemplary apparatus and a process for using it, it should be apparent to those skilled in the art that reasonable modifications may be made without departing from the spirit and scope of the invention. For this reason it is intended that the invention be limited only to the extent of the appended claims.

What is claimed is:

1. Apparatus for mixing viscous and granular materials comprising, in combination, a container, means for supporting a pair of blade assemblies having interleaving tines at each end of said container for differential rotation therein, means for charging the container with unmixed materials, means for discharging the materials after thorough mixing, and means including the ends of said container to scrape all surfaces on the blade assemblies and container of the mixed material as it is discharged from the container.

2. Apparatus for mixing highly viscous and granular materials comprising, in combination, a closed container apertured at each end to receive a blade assembly, a pair of blade assemblies supported in said apertured ends, said blade assemblies when disposed interior of the container having interleaving tines with minimal clearance between their adjacent surfaces, means to counter-rotate said blade assemblies to mix viscous materials placed in the container, at least one of the said blade assemblies being disposed so as to scrape the interior of said container walls during rotation of the blade assembly, and means operable to withdraw the blade assemblies during the mixing operation to dislodge materials from the tines to thereby assure complete mixing of the materials in said container.

3. Apparatus for mixing highly viscous and granular materials in accordance with claim 2 and including means for venting the interior of said container to the atmosphere periodically during the mixing of products at elevated temperatures or that generate gas, said means including a vent aperture formed in said container, a valve normally maintaining said vent closed and means synchronized with at least one of the blades scraping materials from the wall of the container to open said valve immediately after the blade moves beyond the venting apertures and to close said valve before the next succeeding scraping blade carries materials across the face of the valve and cooperating aperture.

4. High shear mixing apparatus including a container having a longitudinal axis and a pair of rotatable end plates, fork-shaped blade assemblies supported interior of said container through opposite end plates whereby the tines of the blade assemblies may be counter-rotated in interleaving paths, means for counter-rotating said blade assemblies and their associated end plates, the tines of said blade assemblies defining paths in close juxtaposition to the cooperating surfaces of their oppositely rotated counterparts and the inside surface of the container to provide a high shear mixing during rotation, and means including the end plates for scraping the interior wall of the container and the tines of the blade assemblies as the mixed material is discharged from the container.

5. High shear mixing apparatus for mixing highly viscous fluids and granular materials comprising, in combination, a container having cooperating blade assemblies supported at each end of the container in an interleaved arrangement for counter-rotation interior of the container, the cooperating blades of each assembly passing immediately adjacent each other and the interior wall of the container, means for supporitng said blade assemblies at each end of the container including rotatable end plates apertured to receive the blades, means for reciprocating said blade assemblies along the axis of rotation as the blade assemblies are counter-rotated whereby the surfaces of the tines are periodically scraped by the surfaces defining the apertures through which the tines are supported interior of the container.

6. High shear mixing apparatus for mixing highly viscous fluids and granular materials in accordance with claim 5 wherein the blades of said assemblies that move immediately adjacent the inside wall of the container carry plastic inserts shaped to continuously scrape material from the wall as the blade assemblies are counter-rotated.

7. Apparatus for mixing viscous materials comprising, in combination, a pair of blade assemblies supported along a common axis for counter-rotation, said blade assemblies having tines lying in planes substantially parallel to the longitudinal axis and at radii whereby the tines of one blade assembly interleave in close proximity to the tines of the other, end plates rotatably supported at each end of the container and having apertures formed therethrough for disposing the tines interior of the container, means operable to withdraw one of said blade assemblies from the container and move it and its cooperating end plate transversely across the edge of the container to remove material from the tines of the blade assembly and the inside walls of the end plate, other means operable to move the other end plate in translation interior of the container to thereby scrape the surfaces of its cooperating blade assembly and the interior surfaces of the container as the mixed material is forced out the open end of the container.

8. Apparatus for mixing viscous and granular materials comprising, in combination, a cylindrical container having a longitudinal axis, left and right blade assemblies supported in overlapping relation interior of said container and at opposite ends thereof for counter-rotation about said axis, each of said blade assemblies including a plurality of tines disposed in planes parallel to said axis to cooperate in an interleaved arrangement and formed to provide minimum gaps between the cooperating surfaces of adjacent tines, the outermost tines of said blade assemblies moving in a path immediately adjacent the interior wall of said container to continuously scrape materials from said wall, left and right end plates rotatably supported adjacent the left and right ends respectively of said container and having apertures formed therethrough to receive the tines of their respective blade assemblies and to in part support said blade assemblies interior of the container, a charging port formed on one side of said container for placing quantities of materials inside the container, means for counter-rotating said blade assemblies, said end plates rotating with their respective blade assemblies, means supporting the blade rotating means for controlled longitudinal movement whereby the blade assemblies may be temporarily withdrawn to scrape material off the tines during the mixing operation, means including said translating means for said right blade assembly operable to withdraw the blade assembly from the container and move it and its associated end plate transverse to the axis so as to scrape materials from the inner surface of said end plate and the bitter ends of the tines and to open the right end of the container, means operable to move the left end plate along the inside of said cylinder while the left blade assembly is maintained longitudinally stationary to thereby scrape materials from the tines of the associated blade assembly and the inside wall of the container as the mixed material is collected, and means operable when the left end plate is fully telescoped interior of said cylinder to return the right end plate and blade assembly to their positions enclosing the open end and in doing so scrape material from the inner side of the left end plate and the bitter ends of the tines of its cooperating blade assembly.

9. Apparatus for mixing and milling granular material including counter-rotating blade assemblies having tines that overlap in interleaved relation to form milling pockets between adjacent tines that entrap granules of the material whereby the facing surfaces on adjacent tines cooperate to pulverize them as the tines are counter-rotated past each other, said pockets constructed by forming the cooperating surfaces on adjacent tines curvilinearly and at an intersecting angle to assure a milling action between the cooperating surfaces.

10. Apparatus for mixing and milling granular material having tines that overlap in interleaved relation to form milling pockets between adjacent tines which entrap granules of the material whereby the facing surfaces on adjacent tines cooperate to pulverize them as the tines are counter-rotated past each other, said pockets constructed by forming the cooperating surfaces on adjacent tines as the arc of a circle the center of which coincides with the axis of rotation of the tines and the arc of a convolute terminating along the axis of rotation, respectively, whereby the maximum distance between the axis of rotation of the blade assemblies and said convolute arc surface is substantially equal to the radius for the circular arc surface with which it cooperates to assure a milling action between the cooperating surfaces.

11. Apparatus in accordance with claim 10 wherein the blade assemblies rotate in a closed container and a milling pocket is also formed between the outermost tine and the interior wall of the container.

12. Means for mixing and milling granular materials comprising a pair of blade assemblies supported at opposite ends of a container in overlapping relation, means to counter-rotate the blades in intermeshing relation, and a plurality of milling pockets defined by the cooperating surfaces of adjacent blades of the respective blade assemblies, said pockets constructed by forming one of the two cooperating surfaces as an arc of a circle the center of which coincides with the axis of rotation of the blade assembly and the other surface as an arc of a gradual convolute that terminates along the axis of rotation, said surfaces substantially contacting at one set of their ends and spaced apart at the other set of their ends to form the pockets, said pockets trapping granules of the material so that grain size is reduced as the blades having the cooperating surfaces move past each other during counter-rotation.

References Cited in the file of this patent

UNITED STATES PATENTS

| | | |
|---|---|---|
| 554,802 | Thomson | Feb. 18, 1896 |
| 1,486,334 | Hapgood | Mar. 11, 1924 |
| 2,441,711 | McFadden | May 18, 1948 |